United States Patent
Han et al.

(10) Patent No.: US 11,003,374 B2
(45) Date of Patent: May 11, 2021

(54) METHODS, DEVICES AND COMPUTER PROGRAM PRODUCTS FOR MANAGING A REDUNDANT ARRAY OF INDEPENDENT DISKS

(71) Applicant: EMC IP Holding Company LLC, Hopkinton, MA (US)

(72) Inventors: Geng Han, Beijing (CN); Jian Gao, Beijing (CN); Liam Xiongcheng Li, Beijing (CN); Hongpo Gao, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 82 days.

(21) Appl. No.: 16/166,476

(22) Filed: Oct. 22, 2018

(65) Prior Publication Data

US 2019/0155535 A1    May 23, 2019

(30) Foreign Application Priority Data

Oct. 27, 2017   (CN) .......................... 201711027427.0

(51) Int. Cl.
*G06F 3/06* (2006.01)
(52) U.S. Cl.
CPC ............ *G06F 3/0644* (2013.01); *G06F 3/061* (2013.01); *G06F 3/0632* (2013.01); *G06F 3/0647* (2013.01); *G06F 3/0689* (2013.01); *G06F 2211/1004* (2013.01)

(58) Field of Classification Search
CPC .......... G06F 3/06–0689; G06F 11/1076–1096; G06F 2003/0691–0698; G06F 2211/1002–1095; G06F 2212/261–262
See application file for complete search history.

(56) References Cited

U.S. PATENT DOCUMENTS

| | | | |
|---|---|---|---|
| 7,111,147 B1 * | 9/2006 | Strange ................. | G06F 3/0607 711/114 |
| 2005/0262038 A1 * | 11/2005 | Sepez .................... | G06F 3/0608 |
| 2007/0118689 A1 * | 5/2007 | Hyde, II ............. | G06F 11/1096 711/114 |
| 2014/0317346 A1 * | 10/2014 | Moon ................... | G06F 3/0689 711/114 |

* cited by examiner

*Primary Examiner* — Nicholas J Simonetti
(74) *Attorney, Agent, or Firm* — BainwoodHuang

(57) ABSTRACT

Embodiments of the present disclosure relate to methods, devices and computer program products for managing a redundant array of independent disks (RAID). The method comprises: in response to a number of a plurality of disks occupied by the RAID exceeding a first threshold, determining a first number of disk pairs to be disassociated among the plurality of disks, the first number of disk pairs at least comprising a first disk and a second disk associated with each other, and a first extent in the first disk and a second extent in the second disk being included in a same RAID extent of the RAID. The method further comprises determining a third disk for migrating at least one of the first extent and the second extent among the plurality of disks. Besides, the method further comprises migrating the at least one extent to the third disk to disassociate the first disk and the second disk so that a second number of disk pairs associated with each other among the plurality of disks is below a second threshold.

20 Claims, 6 Drawing Sheets

METHODS, DEVICES AND COMPUTER PROGRAM PRODUCTS FOR MANAGING A REDUNDANT ARRAY OF INDEPENDENT DISKS

RELATED APPLICATIONS

This application claim priority from Chinese Patent Application Number CN 201711027427.0, filed on Oct. 27, 2017 at the State Intellectual Property Office, China, titled "METHOD, APPARATUS AND COMPUTER PROGRAM PRODUCT FOR MANAGING REDUNDANT ARRAY OF INDEPENDENT DISKS" the contents of which is herein incorporated by reference in its entirety.

FIELD

Embodiments of the present disclosure generally relate to the field of data storage, and more specifically, to methods, devices and computer program products for managing a redundant array of independent disks (RAID).

BACKGROUND

A storage system generally has a plurality of storage disks which can be organized into a disk array. For example, a redundant array of independent disks (RAID) is a data storage virtualization technology which organizes a plurality of storage disks into a single logic unit for the purpose of data redundancy backup and/or performance improvement. Taking RAID5 for example, an RAID group (RG) may include five physical storage disks which can be divided into block-levelled extents having distributed proof information. If a single disk in RG fails, the subsequent reading may be calculated with distributed proof information so that user data will not be lost. Besides, backup disks for the RG may be selected to rebuild the faulty disk. However, before the rebuilding of the faulty disk is completed, if another disk in the RG also fails, user data will be lost.

With the development of storage technology, RG can be distributed onto more than five storage disks. As the number of disks in the RG increases, the probability of simultaneous failure of two disks in RG increases significantly, resulting in a corresponding increase in the probability of loss of user data.

SUMMARY

Embodiments of the present disclosure provide methods, devices and computer program products for managing RAID.

In a first aspect of the present disclosure, there is provided a method of managing RAID. The method comprises: in response to a number of a plurality of disks occupied by the RAID exceeding a first threshold, determining a first number of disk pairs to be disassociated among a plurality of disks, the first number of disk pairs at least comprising a first disk and a second disk associated with each other, and a first extent in the first disk and a second extent in the second disk being included in a same RAID extent of the RAID. The method further comprises determining a third disk among a plurality of disks for migrating at least one of the first extent and the second extent. In addition, the method further comprises migrating at least one extent to the third disk to disassociate the first disk and the second disk so that a second number of disk pairs associated with each other among the plurality of disks is below a second threshold.

In a second aspect of the present disclosure, there is provided an electronic device. The device comprises at least one processing unit and at least one memory. The at least one memory is coupled to the at least one processing unit and stores instructions for execution by the at least one processing unit, the instructions, when executed by the at least one processing unit, causing the device to perform acts, the acts comprising: in response to a number of a plurality of disks occupied by the RAID exceeding a first threshold, determining a first number of disk pairs to be disassociated, the first number of disk pairs at least comprising a first disk and a second disk associated with each other, and a first extent in the first disk and a second extent in the second disk being included in a same RAID extent of the RAID; determining a third disk among the plurality of disks for migrating at least one of the first extent and the second extent; and migrating at least one extent to the third disk to disassociate the first disk and the second disk so that a second number of disk pairs associated with each other among the plurality of disks is below a second threshold.

In a third aspect of the present disclosure, there is provided a computer program product tangibly stored on a non-volatile computer readable medium and including machine executable instructions, the instructions, when executed by a device, causing the device to perform any step of the method described according to the first aspect of the present disclosure.

This Summary is provided to introduce a selection of concepts in a simplified form that are further described below in the Detailed Description. This Summary is not intended to identify key features or essential features of the present disclosure, nor is it intended to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In example embodiments of the present disclosure, the same reference signs usually represent the same components.

In all the drawings, the same or corresponding reference symbols refer to the same or corresponding elements.

DETAILED DESCRIPTION OF EMBODIMENTS

Figure 1:
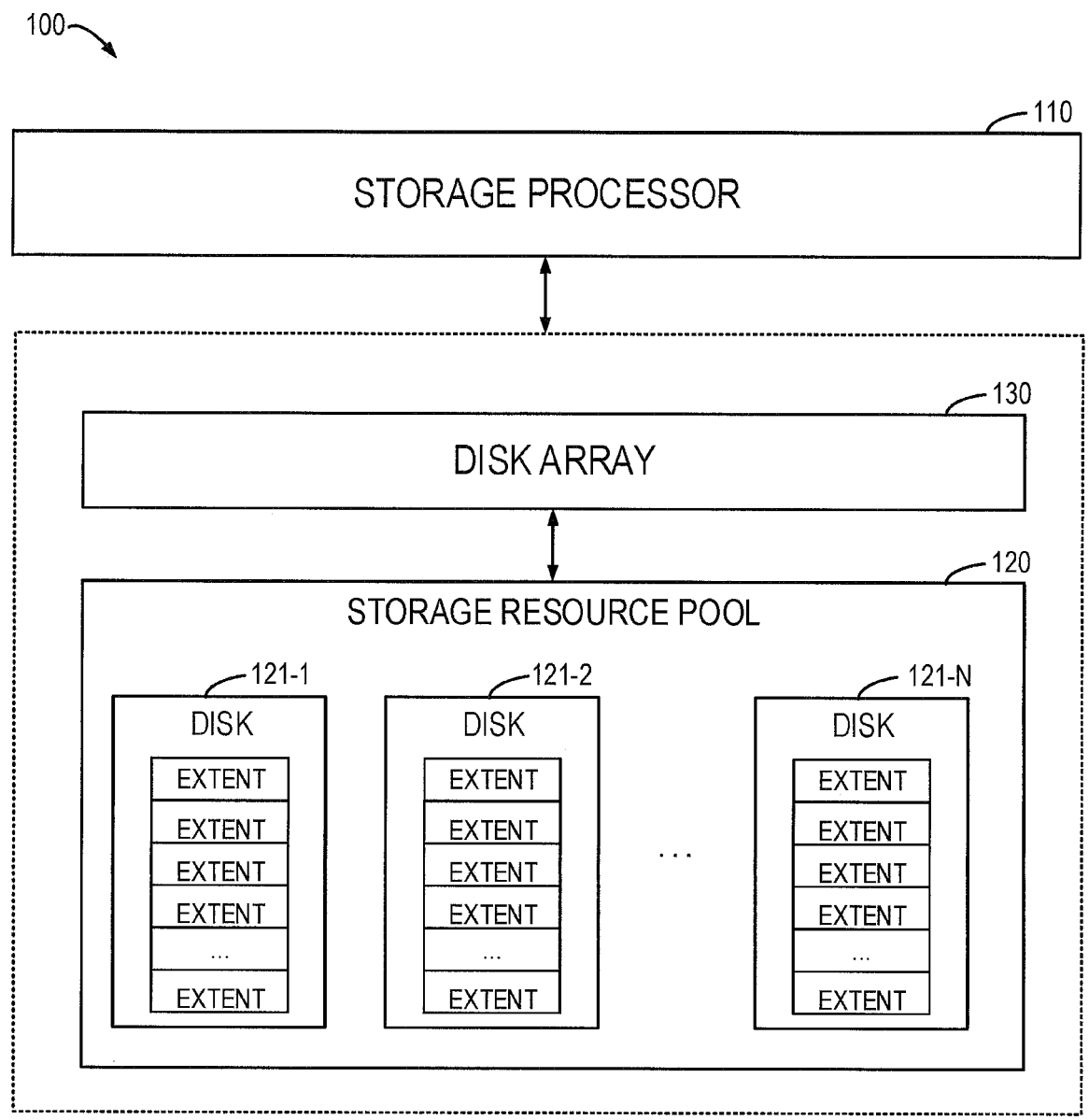
FIG. 1 illustrates an architecture diagram of a storage system according to the embodiments of the present disclosure.

Preferred embodiments of the present disclosure will be described in the following text in greater detail with reference to the drawings. Although preferred embodiments of the present disclosure are displayed in the drawings, it is to be understood that the present disclosure can be implemented in various manners, not limited to the embodiments illustrated herein. On the contrary, these embodiments are provided to make the present disclosure more thorough and complete and convey the scope of the present disclosure completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "an example embodiment" and "an embodiment" are to be read as "at least one example embodiment." The term "another embodiment" is to be read as "at least another embodiment." Terms "first," "second," and others can denote different or identical objects. The following text may also contain other explicit or implicit definitions.

FIG. 1 illustrates an architecture diagram of a storage system 100 according to the embodiments of the present disclosure. As shown in FIG. 1, the storage system 100 may include a storage processor 110 and a storage resource pool 120. It should be appreciated that the structure and function of the storage system 100 as shown in FIG. 1 are only for illustrative purposes, rather than to suggest any limit to the scope of the present disclosure. Embodiments of the present disclosure may be embodied in different structures and/or functions.

As shown in FIG. 1, the storage resource pool 120 may include a plurality of storage disks 121-1, 121-2 . . . 121-N (collectively referred to as "storage disk 121," where N is a positive integer). As used herein, a "storage disk" may refer to any non-volatile storage medium currently known or to be developed in the future, such as a magnetic disk, an optical disk or a solid state disk (SSD), and so on. In the following depiction, the magnetic disk is used as an example for the storage device. However, it should be appreciated that this is only for the ease of depiction, without suggesting any limitations to the scope of the present disclosure.

Each storage disk 121 may be divided into a plurality of extents. For example, the storage processor 110 may organize at least a part of the plurality of extents into a disk array 130. The disk array 130, for example, can be a redundant array of independent disks (RAID) which generally combines a plurality of physical storage units into a logic storage unit for the purpose of data redundancy backup and/or performance improvement. According to the required degree of redundancy and level of performance, it may have different types, such as RAID0, RAID1 . . . RAID5 and so on.

The disk array 130 may include one or more disk array groups (namely, RG), and each disk array group may be composed of multiple RAID extents (abbreviated as "RE"). RE may include data extents for storing user data and proof extents for storing proof information. Take RAID5 with 4D+1P layout as an example, where each RE may include four data extents (namely, "4D") and one proof extent (namely, "1P"). In the following depiction, RAID5 with 4D+1P will be used as an example for the disk array 130. However, it should be appreciated that this is only for the purpose of illustration, rather than to suggest any limit to the scope of the present disclosure. Embodiments of the present disclosure can be applied to other types of RAID having other layouts.

In the implementation of a traditional RAID5, one RG may include five physical storage disks. For example, one RG will consume all the space of five occupied physical storage disks to store data and proof information. Besides, in the implementation of the traditional RAID5, a complete physical storage disk is generally reserved for RG as a backup disk to serve rebuilding of faulty disks in the RG.

Different from the implementation of the traditional RAID, in some embodiments, the disk array 130 as shown in FIG. 1 may also be constructed based on the extent in the physical storage disk 121 (also referred to as "mapping RAID" herein). In other words, in the disk array 130 as shown in FIG. 1, RE may be mapped to the extent of the physical storage disk.

Figure 2:
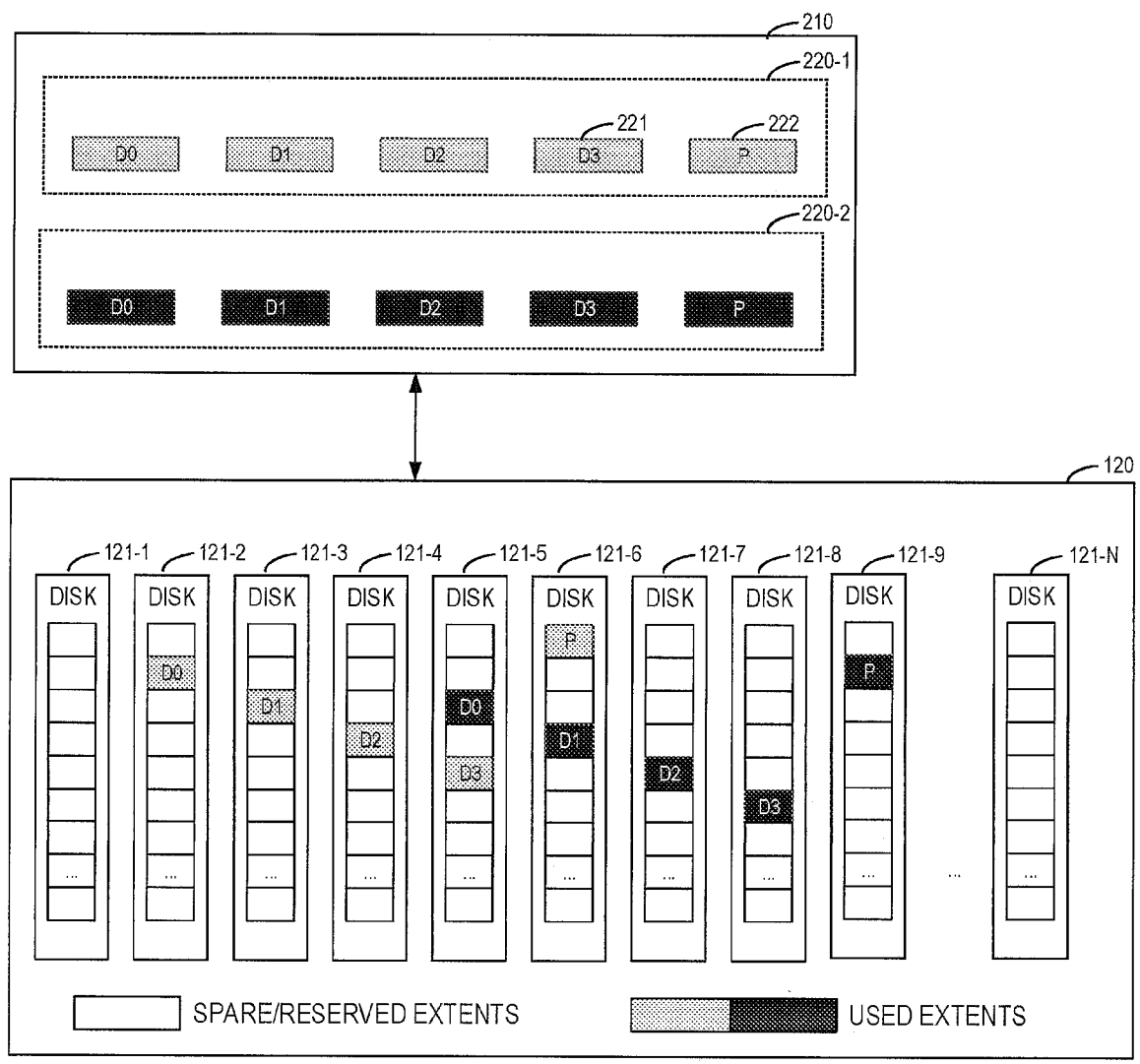
FIG. 2 illustrates a schematic diagram of an example layout of a disk array group according to the embodiments of the present disclosure.

FIG. 2 illustrates a schematic diagram of an example layout of a disk array group 210 in a disk array 130 according to the embodiments of the present disclosure.

As shown in FIG. 2, RG210 may use N disks (for example, N>5), namely, disks 121-1, 121-2 . . . 121-N as shown in FIG. 1. Each disk 121 is divided into a plurality of extents. As shown in FIG. 2, RG210, for example, may include two REs 220-1 and 220-2 (collectively referred to as RE220). These REs are distributed evenly in all the disks 121, where each RE may include four data extents and one proof extent, and these data extents and proof extent are distributed in five different disks. In FIG. 2, for instance, RE 220-1 may be distributed in disks 121-2, 121-3, 121-4, 121-5 and 121-6, while RE 220-2 may be distributed in disks 121-5, 121-6, 121-7, 121-8 and 121-9.

In addition, mapping RAID may use spare extents in each disk as backup extents, rather than reserving the whole physical storage disk as the backup disk, as the traditional RAID5 does. If one disk in disk 121 fails, for each consumed extent in the faulty disk, one spare extent from other disks may be selected randomly as a substitution. Compared with traditional RAID, since more disks are involved in the rebuilding process, the rebuilding and writing for a plurality of extents can be performed in parallel, thereby reducing the rebuilding time of RAID.

However, expanding the traditional RAID to mapping RAID by increasing the number of disks in RG may affect the reliability of RAID. For example, in the traditional RAID5, if two of the five disks included in RG fail simultaneously, or if another disk fails before the rebuilding of a faulty disk is completed, loss of user data will be incurred. Therefore, in the traditional RAID5, an RG forms a "failure domain." In the mapping RAID, to involve possibly more disks into the rebuilding process so as to reduce rebuilding time as much as possible, RE is generally distributed on the whole storage resource pool as evenly as possible so that the whole storage resource pool forms a failure domain. For example, if two disks in the storage resource pool fail simultaneously, or another disk fails before the rebuilding of a faulty disk is completed, loss of user data will be incurred. Since the number of disks in the failure domain of the mapping RAID is obviously more than that included in an RG of the traditional RAID, the probability of loss of user data will increase accordingly.

The inventors have found that although the increase of the number of disks in the mapping RAID increases the probability of data loss accordingly, the rebuilding speed of the mapping RAID is obviously higher than that of the traditional RAID, thereby reducing the rebuilding time of the first failing disk and the probability that two disks are in the failure state simultaneously. That is, higher rebuilding speed will help reduce the probability of loss of user data. To ensure that the reliability of mapping RAID is not lower than that of the traditional RAID, the relation between the rebuilding time, the number of disks and reliability can be depicted with the following equations (1) and (2):

$$\frac{T}{T'} \geq \frac{(N-1)}{(W-1)} \quad (1)$$

$$\frac{T}{T'} \geq \sqrt{\frac{(N-1)(N-2)}{(W-1)*(W-2)}} \quad (2)$$

where T represents the rebuilding time of a single disk in the traditional RAID, T' represents the rebuilding time of a single disk in the mapping RAID, N represents the number of disks in the storage resource pool occupied by the mapping RAID, and W represents the width of the RG (namely, the number of extents included in an RE). For example, equation (1) is for RAID5 with 4D+1P layout, where W=5; while equation (2) is for RAID6 with 4D+2P layout, where W=6. It can be seen from the above equations (1) and (2) that, reliability of mapping RAID can be ensured by reducing T'.

In practice, the speed for rebuilding is generally limited by factors like system memory, capability of central processing unit (CPU), disk bandwidth and the like, which makes it impossible for T' to be reduced unlimitedly. Therefore, to ensure the reliability of mapping RAID, it is necessary to limit the number of disks N in a storage resource pool (namely, a failure domain). Based on the above equation (1) or equation (2), it is possible to determine the biggest number of disks that can be accommodated by the failure domain of the mapping RAID (hereinafter also referred to as "first threshold").

If the number of disks in the failure domain of the mapping RAID exceeds the first threshold, some traditional schemes ensure reliability of mapping RAID by means of dividing the failure domain, namely, dividing disks with a number exceeding the first threshold into two failure domains, so that the number of disks in each failure domain is below the first threshold. However, this scheme will cause a great quantity of data migration. Besides, as described above, each failure domain needs to reserve separate backup extents. If the failure domains are divided, the number of reserved backup extents will increase accordingly.

Embodiments of the present disclosure provide a scheme for managing RAID, which can ensure reliability of mapping RAID. If the number of disks in the failure domain of the mapping RAID exceeds the first threshold, this scheme can reduce the occurrence of data migration as much as possible and meanwhile, make it unnecessary to add extra reserved backup space.

Figure 3:
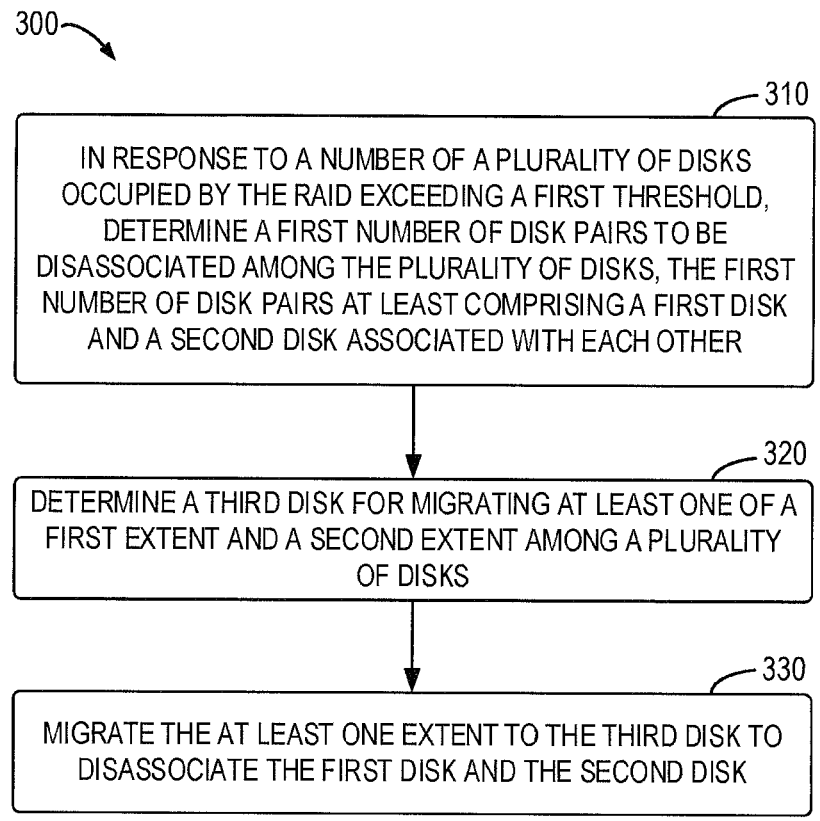
FIG. 3 illustrates a flowchart of a method for managing RAID according to the embodiments of the present disclosure.

FIG. 3 illustrates a flowchart of a method 300 for managing RAID according to the embodiments of the present disclosure. The acts involved in method 300 will be described below with reference to the storage system 100 as shown in FIG. 1. For example, in some embodiments, method 300 may be carried out by a storage processor 110. Besides, method 300 will be described below with the disk array 130 as an object, where the disk array 130, for instance, includes RG 210 as shown in FIG. 2. It is to be understood that method 300 may further include additional acts not shown and/or omit the shown acts, and the scope of the present disclosure is not limited in this regard.

At block 310, the storage processor 110, in response to the number of a plurality of disks occupied by RG 210 exceeding the first threshold, determines the number of disk pairs (hereinafter also referred to as "first number") to be disassociated among the plurality of disks.

In some embodiments, one of the first number of disk pairs may include a pair of disks associated with each other (for example, referred to as "first disk" and "second disk"), for example. As used herein, the phrase "associated with each other" means that extents in the first disk and extents in the second disk are included into a same RE of the RG 210 simultaneously. In some embodiments, the number of REs involving the first disk and the second disk simultaneously may be greater than 1. In the present disclosure, "association degree" of disk pairs is used to represent the number of REs associated with the disk pairs in RG 210. For example, as shown in FIG. 2, RE 220-1 in RG 210 involves disk 121-5 and disk 121-6 simultaneously and besides, RE 220-2 also involves disk 121-5 and 121-6 simultaneously. Hence, the association degree between disk 121-5 and disk 121-6 is 2. Correspondingly, as used herein, the phrase "disassociate" represents causing any one of the REs in RG 210 not involve the extents in the first disk and the extents in the second disk simultaneously, namely, causing the association degree between the first disk and the second disk to be 0.

As described above, if any two disks out of N disks occupied by RG 210 fail, loss of user data will be incurred. That is, for RG 210 distributed evenly on N disks, there are CN combinations in total (namely, CN disk pairs). Assuming that the probability of a disk failing at any moment is P, the rebuilding time of the faulty disk is T and the probability for another disk failing during the rebuilding time T is P (T), then data loss probability $P_{datalost}$ can be represented with the following equation (3):

$$P_{datalost} = C_N^2 * P * P(T) \quad (3)$$

Besides, assuming that to ensure reliability of mapping RAID, the biggest number of disks ("first threshold" described above) that can be accommodated by the failure domain of the mapping RAID is M, its corresponding data loss probability is $P_{max} = C_M^2 * P * P(T)$ (for example, $P_{max}$ generally corresponds to the reliability of the traditional RAID), which generally means that if the number of disks occupied by RG210 exceeds M, the corresponding data loss probability of RG 210 $P_{datalost}$ will exceed $P_{max}$. However, as can be seen from equation (3), if the number of disk pairs associated with each other in RG 210 (hereinafter referred to as "second number") is below $C_M^2$ (hereinafter also referred to as "second threshold"), the corresponding data loss probability $P_{datalost}$ will be below $P_{max}$.

Therefore, in some embodiments, if the number N of a plurality of disks occupied by RG 210 exceeds the first threshold M, the storage processor 110 may cause some disks originally associated with each other to be disassociated, and ensure that the second number of disk pairs associated with each other in RG 210 will be below the second threshold a thereby ensuring reliability of RG 210.

In some embodiments, the storage processor 110 may determine the first number of disk pairs to be disassociated based on the number N of a plurality of disks occupied by the RG 210 and the second threshold $C_M^2$. The first number may be $C_M^2 - C_N^2$. For example, assuming M=64 and N=65, the first number of disk pairs to be disassociated is $C_{65}^2 - C_{64}^2$, namely, 64. For another example, assuming that M=64 and N=66, then the first number of disk pairs to be disassociated is $C_{66}^2 - C_{64}^2$, namely, 129. For the purpose of simplified depiction, embodiments of the present disclosure will be described below taking M=64 and N=65 as an example.

The storage processor 110 may select from N disks the first number of disk pairs to be disassociated arbitrarily. In some embodiments, the storage processor 110 may select the first number of disk pairs as evenly as possible. For example, the storage processor 110 may select the first number of disk pairs in the round robin mode. Taking M=64 and N=65 as an example, the first number of selected disk pairs may include, for instance, (120-1, 120-2), (120-2, 120-3), (120-3, 120-4) . . . (120-64, 120-1). Alternatively, in some other embodiments, the storage processor 110 may also select disk pairs with lower original association degree from N disks, thereby reducing the frequency of data migration in the specific operation of subsequent disassociation.

In some embodiments, the association degree of disk pairs in RG 210 occupying N disks may be indicated by the relation matrix of N×N. In the relation matrix, the value of the element NW(i, j) at ith line and jth column may indicate the association degree of disk pairs (120-$i$, 120-$j$), namely, times for the extents in disk 120-$i$ and extents in disk 120-$j$ to be included simultaneously in the same RE in the RG 210. The relation matrix may be a symmetric matrix, namely, NW(i, j)=NW(j, i). In addition, the relation matrix may indicate the homogeneity of the distribution of the extents of mapping RAID among a plurality of disks. For example, if the values of the elements in the relation matrix are close to each other, it can indicate that the extents of mapping RAID are distributed evenly among a plurality of disks.

Take RG 210 as shown in FIG. 2 as an example. RE 220-1 involves disks 121-2, 121-3, 121-4, 121-5 and 121-6. If RE 220-1 is created, values of elements NW(2, 3), NW(2, 4), NW(2, 5), NW(2, 6), NW(3, 4), NW(3, 5), NW(3, 6), NW(4, 5), NW(4, 6) and NW(5, 6) in the relation matrix and their symmetrical elements are added by 1 accordingly. RE 220-2 involves disks 121-5, 121-6, 121-7, 121-8 and 121-9. If RE 220-2 is created, the values of elements NW(5, 6), NW(5, 7), NW(5, 8), NW(5, 9), NW(6, 7), NW(6, 8), NW(6, 9), NW(7, 8), NW(7, 9) and NW(8, 9) in the relation matrix and their symmetrical elements are added by 1 accordingly.

In some embodiments, the storage processor 110 may select from the relation matrix associated with RG 210 the first number of disk pairs corresponding to the elements with smaller values for disassociation.

The operation of disassociating disk pairs will be described below in detail specifically for disk pairs 121-5 and 121-6 in RG 210. In the following, disk 121-5 is also referred to as "first disk" while disk 121-6 is also referred to as "second disk." As shown in FIG. 2, RE 220-1 occupies the extent 221 on disk 121-5 and the extent 222 on the disk 121-6. In the following, extent 221 is also referred to as "first extent" and the extent 222 is also referred to as "second extent."

At block 320, the storage processor 110 determines a disk (hereinafter also referred to as "third disk") among a plurality of disks for migrating at least one of the first extent 221 and the second extent 222.

In some embodiments, the storage processor 110 may select at least one extent to be migrated from the first extent 221 and the second extent 222 and determine the third disk for migrating the at least one extent.

For example, the storage processor 110 may determine at least one extent to be migrated and the third disk in the following manner which can prevent the migration of the at least one extent to the third disk from causing the association degree of any of the first number of disk pairs determined at block 320 to increase, thereby avoiding the case that the first number of disk pairs cannot be disassociated all the time.

For the ease of depiction, the disk that the at least one extent to be migrated is located in is referred to as "source disk," and the third disk for migrating the at least one extent is referred to as "target disk." For example, the source disk may be the first disk (namely, disk 121-5) or the second disk (namely, disk 121-6), while the third disk may be any disk in the plurality of disks 121 apart from disks (121-2, 121-3, 121-4, 121-5 and 121-6) occupied by RE 220-1. In other words, a plurality of different candidate combinations of the source disk and target disk may exist.

In some embodiments, to select a preferred migration scheme from a plurality of candidate combinations, the storage processor 110 may score each candidate combination and the corresponding score of each candidate combination may indicate the influence of migrating at least one extent from the corresponding source disk to the corresponding target disk upon the distribution of RAID extents in RG 210 among a plurality of disks. The distribution of RAID extents among a plurality of disks may be indicated by, for instance, the relation matrix depicted above. The storage processor 110 may select the preferred migration scheme from the plurality of candidate combinations based on the corresponding scores of the plurality of candidate combinations.

In some embodiments, the corresponding score of each candidate combination may be determined based on the change of the relation matrix before and after migration.

If the extent in the RE 220-1 migrates from the source disk to the target disk, the association degree between disks associated with RE 220-1 will be changed. For example, eight elements in the relation matrix associated with RG 210 will be updated. As the association degree between four disks in RE 220-1 and the source disk decreases, the association degree between these four disks and the target disk will increase. That is, the values of four elements in the relation matrix will be reduced while the values of the other four elements will be increased accordingly.

In some embodiments, assuming that the source disk is represented as 121-$s$, and the target disk is represented as 121-$d$, then the score SCORE associated with the candidate combination (121-$s$->121-$d$) can be represented as:

$$\text{SCORE} = \Sigma(NW(i,s)) - \Sigma(NW(i,d)), \text{where } 121\text{-}i \in \text{RE } 220\text{-}1 \quad (4)$$

If the score is greater than zero, it may indicate that the candidate migration scheme will make the relation matrix evener, namely, causing the distribution of RG 210 among a plurality of disks to be evener. Conversely, if the score is smaller than zero, it may indicate that the candidate migration scheme will make the relation matrix less even, namely, causing the distribution of RG 210 among a plurality of disks to be less even.

In some embodiments, the storage processor 100 may score each candidate combination among a plurality of candidate combinations based on the above equation (4), and select the candidate combination with the highest score therefrom. That is, the preferred migration scheme enables the distribution of the mapping RAID among a plurality of disks to be evener, thereby improving the performance of the mapping RAID. In this manner, the storage processor 110 can determine which one of the first extent 221 and the second extent 222 is to be migrated and which disk this extent is to be migrated to.

At block 330, the storage processor 110 migrates at least one extent to the third disk to disassociate the first disk and the second disk so that the number of disk pairs associated with each other among a plurality of disks (also referred to as "second number") is below the second threshold.

In some embodiments, the storage processor 110 may migrate the extent to the third disk by copying data stored in the extent determined to be migrated into the spare extent of the third disk. Besides, in some embodiments, if the association degree of the first disk and the second disk is greater than 1 (for example, as shown in FIG. 2, the association degree of disks 121-5 and 121-6 is 2), the storage processor 110 may perform blocks 320 and 330 iteratively for each RE associated with first disk and second disk until the association degree of the first disk and the second disk is 0.

Figure 4:
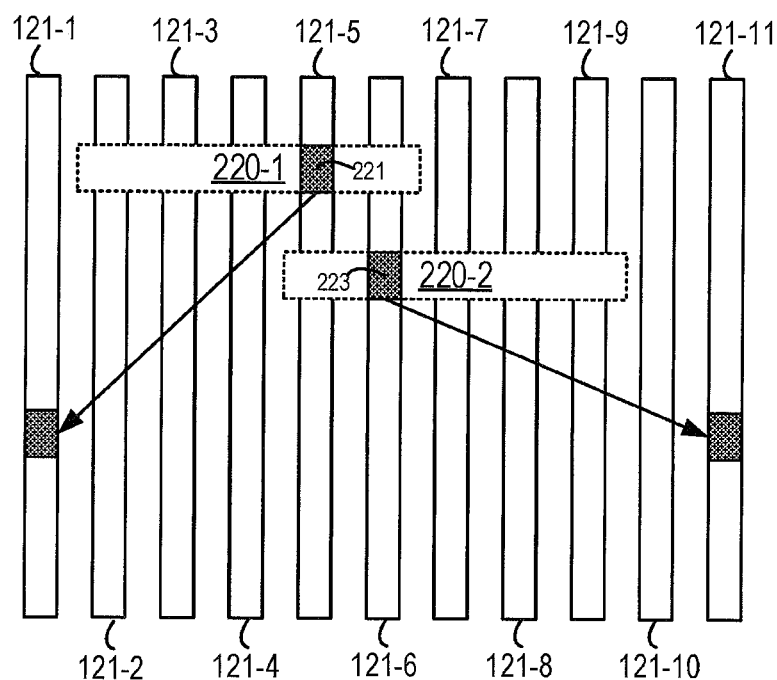
FIG. 4 illustrates a schematic diagram of disassociating disk pairs according to the embodiments of the present disclosure.

For example, FIG. 4 illustrates a schematic diagram of disassociating disk pairs 121-5 and 121-6 as shown in FIG. 2 according to the embodiments of the present disclosure. As shown in FIG. 4, by performing the above method 300, the extent 221 in RE 220-1 is migrated to disk 121-1, and the extent 223 in the RE 220-2 is migrated to disk 121-11 so that the disks 121-5 and 121-6 are disassociated.

In this manner, by dissociating the first number (namely, $C_M^2 - C_N^2$) of disk pairs associated with each other, the storage processor 110 may ensure that the second number of disk pairs associated with each other among the plurality of disks occupied by RG 210 is below the second threshold (namely, $C_M^2$), thereby ensuring the reliability of RG 210.

Figure 5:
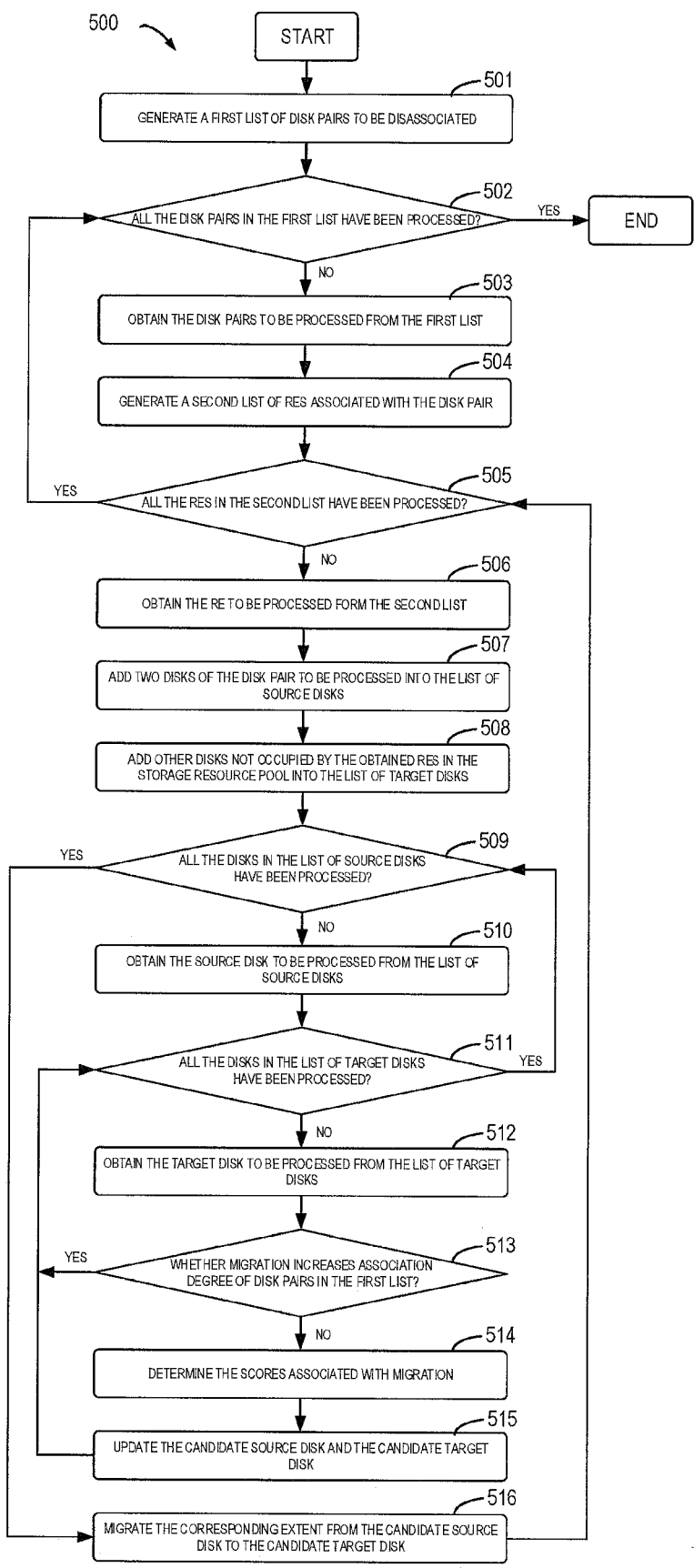
FIG. 5 illustrates a flowchart of a method for managing RAID according to the embodiments of the present disclosure.

FIG. 5 illustrates a flowchart of a method 500 for managing RAID according to the embodiments of the present disclosure. The method 500 may be a more specific example implementation of the method 300. For example, the method 500 may be carried out by the storage processor 110 as shown in FIG. 1. It is to be understood that method 500 may further include additional acts not shown and/or omit the shown acts, and the scope of the present disclosure is not limited in this regard.

The storage processor 110, in response to the number of a plurality of disks occupied by RAID exceeding the first threshold, generates (501) a first list of disk pairs to be disassociated.

The storage processor 110 may check (502) if all the disk pairs in the first list have been processed. If yes, method 500 stops; if no, then the storage processor 110 may obtain (503) the disk pairs to be processed from the first list.

The storage processor 110 may generate (504) a second list of REs associated with the obtained disk pairs.

The storage processor 110 may check (505) if REs in the second list have been processed. If yes, then method 500 returns to block 520; if no, the storage processor 110 may obtain (506) the REs to be processed from the second list.

The storage processor 110 may add (507) two disks of the disk pairs to be processed into the list of source disks, and add (508) other disks not occupied by the obtained REs in the storage resource pool into the list of the target disks.

The storage processor 110 may check (509) if all the disks in the list of source disks have been processed. If no, then the storage processor 110 may obtain (510) the source disks to be processed from the list of source disks.

The storage processor 110 may further check (511) if all the disks in the list of target disks have been processed. If yes, then method 500 proceeds to block 509; if no, the storage processor 110 may obtain (512) the target disks to be processed from the list of target disks.

The storage processor 110 may determine (513) whether the migration from the obtained source disks to the obtained target disks would cause the association degree of disk pairs in the first list to increase. If yes, the method 500 proceeds to block 511; if no, the storage processor 110 may further determine (514) the score associated with the migration from the source disk to the target disk, and update (515) the candidate source disk and the candidate target disk based on the score so that the score associated with the migration from the candidate source disk to the candidate target disk is the highest. Then, method 500 proceeds to block 511.

If at block 509, the storage processor 110 determines that all the disks in the list of source disks have been processed, then the storage processor 110 may migrate (516) the corresponding disk extent from the candidate source disk to the candidate target disk. Then, method 500 proceeds to block 505.

Through the above depiction, it can be seen that the scheme for managing RAID according to the embodiments of the present disclosure can ensure reliability of mapping RAID. If the number of disks in the failure domain of the mapping RAID exceeds the highest number of disks that can be accommodated by the failure domain, the scheme can reduce the occurrence of data migration as much as possible while ensuring reliability of mapping RAID, and meanwhile, make it unnecessary to add extra reserved backup space.

Figure 6:
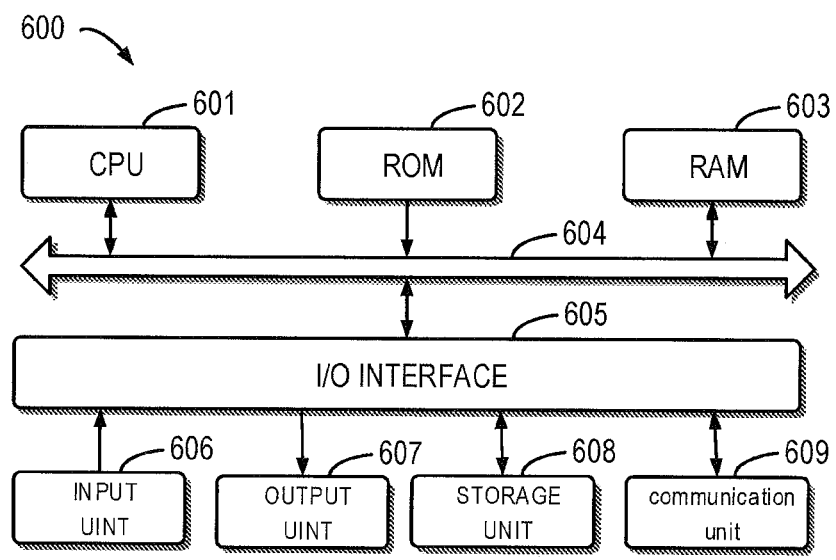
FIG. 6 illustrates a schematic diagram of an illustrative device for implementing the embodiments of the present disclosure.

FIG. 6 illustrates a schematic diagram of an example device 600 for implementing the embodiments of the present disclosure. For example, the storage processor 110 as shown in FIG. 1 can be implemented by the device 600. As illustrated in the figure, the device 600 comprises a central processing unit (CPU) 601 which can execute various appropriate actions and processing based on the computer program instructions stored in a read-only memory (ROM) 602 or the computer program instructions loaded into a random access memory (RAM) 603 from a storage unit 608. The RAM 603 also stores all kinds of programs and data required by operating the storage apparatus 600. CPU 601, ROM 602 and RAM 603 are connected to each other via a bus 604, to which an input/output (I/O) interface 605 is also connected.

A plurality of components in the device 600 are connected to the I/O interface 605, including: an input unit 606, such as keyboard, mouse and the like; an output unit 607, such as various types of displays, loudspeakers and the like; a storage unit 608, such as magnetic disk, optical disk and the like; and a communication unit 609, such as network card, modem, wireless communication transceiver and the like. The communication unit 609 allows the device 600 to exchange information/data with other devices through computer networks such as Internet and/or various telecommunication networks.

Each procedure and processing described above, such as method 300 and/or 500, can be carried out by the processing unit 601. For example, in some embodiments, the method 300 and/or 500 can be implemented as computer software programs, which are tangibly included in a machine-readable medium, such as storage unit 608. In some embodiments, the computer program can be partially or completely loaded and/or installed to the device 600 via ROM 602 and/or the communication unit 609. If the computer program is loaded to RAM 603 and executed by CPU 601, one or more steps of the above described method 300 and/or 500 are implemented.

The present disclosure may be a method, an apparatus, a system and/or a computer program product. The computer program product can include a computer-readable storage medium loaded with computer-readable program instructions thereon for executing various aspects of the present disclosure.

The computer-readable storage medium can be a tangible device capable of holding and storing instructions used by the instruction-executing device. The computer-readable storage medium can be, but not limited to, for example, electrical storage devices, magnetic storage devices, optical storage devices, electromagnetic storage devices, semiconductor storage devices or any random appropriate combinations thereof. More specific examples (non-exhaustive list) of the computer-readable storage medium comprise: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any random suitable combinations thereof. The computer-readable storage medium used herein is not interpreted as a transient signal itself, such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described here can be downloaded from the computer-readable storage medium to various computing/processing devices, or to external computers or external storage devices via Internet, local area network, wide area network and/or wireless network. The network can comprise copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure can be assembly instructions, instructions of instruction set architecture (ISA), machine instructions, machine-related instructions, microcodes, firmware instructions, state setting data, or a source code or target code written by any combinations of one or more programming languages comprising object-oriented programming languages, such as Smalltalk, C++ and so on, and conventional procedural programming languages, such as "C" language or similar programming languages. The computer-readable program instructions can be completely or partially executed on the user computer, or executed as an independent software package, or executed partially on the user computer and partially on the remote computer, or completely executed on the remote computer or the server. In the case where a remote computer is involved, the remote computer can be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit can execute computer-readable program instructions to implement various aspects of the present disclosure.

Various aspects of the present disclosure are described in reference with the flow chart and/or block diagram of the method, device (system) and computer program product according to the embodiments of the present disclosure. It is to be understood that each block in the flow chart and/or block diagram and any combinations of various blocks thereof can be implemented by the computer-readable program instructions.

The computer-readable program instructions can be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions can also be stored in the computer-readable storage medium. These instructions enable the computer, the programmable data processing device and/or other devices to operate in a particular way, such that the computer-readable medium storing instructions can comprise a manufactured article that includes instructions for implementing various aspects of the functions/actions specified in one or more blocks of the flow chart and/or block diagram.

The computer-readable program instructions can also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices can realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram can represent a module, a program segment, or a portion of the instruction. The module, the program segment or the portion of the instruction includes one or more executable instructions for implementing specified logic functions. In some alternative implementations, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flow chart, and any combinations of the blocks thereof can be implemented by a dedicated hardware-based system for implementing specified functions or actions, or a combination of the dedicated hardware and the computer instructions.

Various embodiment of the present disclosure has been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those ordinary skilled in the art.

We claim:

1. A method of managing redundant array of independent disks (RAID), comprising:
in response to a number of a plurality of disks occupied by the RAID exceeding a first threshold, determining a first number of disk pairs to be disassociated among the plurality of disks, the first number of disk pairs at least comprising a first disk and a second disk associated with each other, and a first extent in the first disk and a second extent in the second disk being included in a same RAID extent of the RAID;

determining a third disk among the plurality of disks for migrating at least one of the first extent and the second extent; and migrating the at least one extent to the third disk to disassociate the first disk and the second disk so that a second number of disk pairs associated with each other among the plurality of disks is below a second threshold.

2. The method according to claim 1, wherein determining the first number of disk pairs comprises:

determining the first number based on the second threshold and the number of the plurality of disks.

3. The method according to claim 1, wherein determining the third disk comprises determining the at least one extent and the third disk by:

preventing the migration of the at least one extent to the third disk from causing an association degree of disk pairs among the first number of disk pairs to increase, the association degree indicating the number of RAID extents associated with the disk pairs in the RAID.

4. The method according to claim 3, wherein determining the third disk comprises:

determining a plurality of candidate disks for migrating the at least one extent;

determining respective scores of the plurality of candidate disks, the score of one of the plurality of candidate disks indicating an influence of the migration of the at least one extent to the candidate disk upon a distribution of RAID extents in the RAID among the plurality of disks; and selecting the third disk from the plurality of candidate disks based on the scores.

5. The method according to claim 4, wherein determining the score of one of the plurality of candidate disks comprises:

determining a first relation matrix, the first relation matrix indicating a first distribution of RAID extents in the RAID among the plurality of disks before the at least one extent is migrated to the candidate disk;

determining a second relation matrix, the second relation matrix indicating a second distribution of RAID extents in the RAID among the plurality of disks after the migration; and determining the score based on the first relation matrix and the second relation matrix.

6. The method according to claim 5, wherein a first element in the first relation matrix indicates a third number of RAID extents associated with a first disk pair in the RAID, and a second element corresponding to the first element in the second relation matrix indicates a fourth number of RAID extents associated with the first disk pair in the RAID.

7. The method according to claim 1, wherein migrating the at least one extent to the third disk comprises:

copying data stored in the at least one extent to at least one spare extent in the third disk.

8. An electronic device, comprising:

at least one processing unit;

at least one memory coupled to the at least one processing unit and storing instructions for execution by the at least one processing unit, the instructions, when executed by the at least one processing unit, causing the device to perform acts, the acts comprising:

in response to a number of a plurality of disks occupied by the RAID exceeding a first threshold, determining a first number of disk pairs to be disassociated among the plurality of disks, the first number of disk pairs at least comprising a first disk and a second disk associated with each other, and a first extent in the first disk and a second extent in the second disk being included in a same RAID extent of the RAID;

determining a third disk among the plurality of disks for migrating at least one of the first extent and the second extent; and migrating the at least one extent to the third disk to disassociate the first disk and the second disk so that a second number of disk pairs associated with each other among the plurality of disks is below a second threshold.

9. The device according to claim 8, wherein determining the first number of disk pairs comprises:

determining the first number based on the second threshold and the number of the plurality of disks.

10. The device according to claim 8, wherein determining the third disk comprises determining the at least one extent and the third disk by:

preventing the migration of the at least one extent to the third disk from causing an association degree of disk pairs among the first number of disk pairs to increase, the association degree indicating the number of RAID extents associated with the disk pairs in the RAID.

11. The device according to claim 8, wherein determining the third disk comprises:

determining a plurality of candidate disks for migrating the at least one extent;

determining respective scores of the plurality of candidate disks, the score of one of the plurality of candidate disks indicating the influence of the migration of the at least one extent to the candidate disk upon a distribution of RAID extents in the RAID among the plurality of disks; and selecting the third disk from the plurality of candidate disks based on the scores.

12. The device according to claim 11, wherein determining the score of one of the plurality of candidate disks comprises:

determining a first relation matrix, the first relation matrix indicating a first distribution of RAID extents in the RAID among the plurality of disks before the at least one extent is migrated to the candidate disk;

determining a second relation matrix, the second relation matrix indicating a second distribution of RAID extents in the RAID among the plurality of disks after the migration; and determining the score based on the first relation matrix and the second relation matrix.

13. The device according to claim 12, wherein a first element in the first relation matrix indicates a third number of RAID extents associated with a first disk pair in the RAID, and a second element corresponding to the first element in the second relation matrix indicates a fourth number of RAID extents associated with the first disk pair in the RAID.

14. The device according to claim 8, wherein migrating the at least one extent to the third disk comprises:

copying data stored in the at least one extent to at least one spare extent in the third disk.

15. A computer program product for managing redundant array of independent disks (RAID), the computer program product comprising:

a non-transitory computer readable medium encoded with computer-executable code, the code configured to enable the execution of:
  in response to a number of a plurality of disks occupied by the RAID exceeding a first threshold, determining a first number of disk pairs to be disassociated among the plurality of disks, the first number of disk pairs at least comprising a first disk and a second disk associated with each other, and a first extent in the first disk and a second extent in the second disk being included in a same RAID extent of the RAID;
  determining a third disk among the plurality of disks for migrating at least one of the first extent and the second extent; and
  migrating the at least one extent to the third disk to disassociate the first disk and the second disk so that a second number of disk pairs associated with each other among the plurality of disks is below a second threshold.

16. The computer program product of claim 15, wherein determining the first number of disk pairs comprises:
  determining the first number based on the second threshold and the number of the plurality of disks.

17. The computer program product of claim 15, wherein determining the third disk comprises determining the at least one extent and the third disk by:
  preventing the migration of the at least one extent to the third disk from causing an association degree of disk pairs among the first number of disk pairs to increase, the association degree indicating the number of RAID extents associated with the disk pairs in the RAID.

18. The computer program product of claim 17, wherein determining the third disk comprises:
  determining a plurality of candidate disks for migrating the at least one extent;
  determining respective scores of the plurality of candidate disks, the score of one of the plurality of candidate disks indicating an influence of the migration of the at least one extent to the candidate disk upon a distribution of RAID extents in the RAID among the plurality of disks; and
  selecting the third disk from the plurality of candidate disks based on the scores.

19. The computer program product of claim 18, wherein determining the score of one of the plurality of candidate disks comprises:
  determining a first relation matrix, the first relation matrix indicating a first distribution of RAID extents in the RAID among the plurality of disks before the at least one extent is migrated to the candidate disk;
  determining a second relation matrix, the second relation matrix indicating a second distribution of RAID extents in the RAID among the plurality of disks after the migration; and
  determining the score based on the first relation matrix and the second relation matrix.

20. The computer program product of claim 19, wherein a first element in the first relation matrix indicates a third number of RAID extents associated with a first disk pair in the RAID, and a second element corresponding to the first element in the second relation matrix indicates a fourth number of RAID extents associated with the first disk pair in the RAID.

* * * * *